United States Patent [19]

Ziernicki

[11] Patent Number: 4,482,125

[45] Date of Patent: Nov. 13, 1984

[54] LAMP SUPPORTING UNIT FOR ABSORBING SHOCKS AND VIBRATIONS

[75] Inventor: Richard Ziernicki, Littleton, Colo.

[73] Assignee: Over-Lowe Company, Englewood, Colo.

[21] Appl. No.: 421,590

[22] Filed: Sep. 22, 1982

[51] Int. Cl.$^{3}$ .............................................. F16M 13/00

[52] U.S. Cl. .................................... 248/604; 362/145; 362/369

[58] Field of Search ........................ 248/603, 604, 599; 362/369, 145

[56] References Cited

U.S. PATENT DOCUMENTS

| | | | |
|---|---|---|---|
| 849,975 | 4/1907 | Carlson | 248/604 |
| 1,554,501 | 9/1925 | Horle et al. | 248/610 |
| 1,643,925 | 9/1927 | Cooke, Jr. | 362/369 |
| 1,938,799 | 12/1933 | Bourne | 248/603 |
| 1,983,734 | 12/1934 | Cahill | 362/145 |
| 2,799,778 | 7/1957 | Stephenson | 248/604 |
| 4,141,056 | 2/1979 | Neely | 362/145 |

FOREIGN PATENT DOCUMENTS

| | | | |
|---|---|---|---|
| 201001 | 5/1955 | Australia | 248/604 |

*Primary Examiner*—J. Franklin Foss
*Assistant Examiner*—David L. Talbott

[57] ABSTRACT

A lamp supporting device is provided for use in preventing shock damage as the device is moved. The device is combined with a mobile unit to produce a portable lighting unit having lamps mounted to the lamp supporting device. The lamp supporting device includes an elongated, horizontally extending support member and a frame. The support member is positioned through the center of the frame so that the frame is spaced from the support member and surrounds the midportion of the support member. Eight springs interconnect the frame and the support member. The lamps are mounted on the support member and spaced from the frame. The top end of a pole is connected to the frame. The frame extends upwardly from the pole top end. The bottom end of the pole is joined to the mobile unit. The springs act to absorb any shocks transmitted to the shock absorbing device as the portable lighting unit is moved.

1 Claim, 5 Drawing Figures

LAMP SUPPORTING UNIT FOR ABSORBING SHOCKS AND VIBRATIONS

FIELD OF THE INVENTION

The present invention relates to a device for absorbing shocks and, in particular, to a device for absorbing shocks, having both a vertical component and horizontal component, in order to prevent damage to fragile articles, such as lamps.

BACKGROUND ART

Various shock absorbing units have been devised which include a member which is used to support relatively easily damaged articles. In the case of lamp bulbs or other articles formed with glass, springs have been connected to the structure, which is used to support such fragile articles. The springs act to absorb or dampen any shocks, which might be received by the support structure.

The present invention is a shock absorbing device characterized by its relatively compact design for absorbing shocks which are produced in both horizontal and vertical directions. This device is particularly suited to support lamps having bulbs which form a portion of a portable, mobile lighting unit. The lamp bulbs are subjected to significant shocks at those times when the mobile, portable unit moves over rough or uneven terrain. Such shocks can result in breakage of the lamps and bulbs. Since it is a difficult and expensive task to replace broken or damaged lamps or bulbs, the novel structure of the present invention provides an effective shock absorbing tool to minimize the occurrence of damage to the lamps and bulbs.

STATEMENT RELATING TO PRIOR ART

U.S. Pat. No. 1,983,734 to Cahill issued Dec. 11, 1934, discloses a mobile light tower with a mast vertically supported on a compression spring and held in vertical alignment in a tower having a square frame at its top using four springs extending from the four corners of the frame.

The shock absorbing device of the present invention is structurally distinct from the device disclosed in the Cahill patent. In addition, the same spring arrangement is able to absorb both horizontal and vertical components of shocks, unlike the device described in the Cahill patent, which discloses a single spring for absorbing vertically directed shocks and additional springs, separate from the single spring for absorbing vertically directed shocks, for absorbing horizontal components of shocks.

U.S. Pat. No. 1,554,501 to Horle et. al. issued Sep. 22, 1925 relates to a vacuum tube support structure in which a horizontal mounting of the vacuum tubes is provided by two oblique springs located at each of the four corners of the vacuum tube support structure and which extend to an outside framework.

U.S. Pat. No. 1,643,925 to Cooke, Jr. issued Sep. 27, 1927 provides a traffic signal support structure in which four springs are fastened to the lamp or traffic signal casing. The opposite end of the springs are attached to a base for cushioning the lamp casing and for limiting the swinging movement of the lamp casing.

U.S. Pat. No. 849,975 to Carlson issued Apr. 9, 1907 shows a stool with a center post suspended vertically by four contractile springs at its upper end and four contractile springs at its lower end. Each of the springs is connected at its opposite end to one of the four legs.

DISCLOSURE OF THE INVENTION

In accordance with the present invention, a shock absorbing device is provided which includes a generally horizontally positioned support member and a frame surrounding, but spaced from, a portion of the support member. The frame is connected to the top of a pole, which is adapted to be joined at its bottom end to a movable unit. The frame extends vertically upwardly from the top of the pole. Eight springs interconnect the frame and the support member. Each spring forms an acute angle with respect to a horizontal plane parallel to the horizontally extending support member. Four of the eight springs are attached to a first side of the frame while the remaining four springs are attached to a second side of the frame. A number of lamps are adapted to be mounted to the support member.

When the mobile unit with the shock absorbing device and lamps connected to the shock absorbing device are moved, the springs act to absorb any vertical and horizontal components of shocks which may be generated during the movement in order to minimize damage to the lamps. The springs can be both under compression and tension and one or more the springs might be compressed and, at the same time, other of the springs might be under tension.

In view of the foregoing, it is readily seen that a number of advantages and objectives of the present invention have been achieved. A number of springs have been uniquely joined to a support member and a frame to provide, in a single spring assembly, the capability of absorbing both vertical components and horizontal components of shocks. The disclosed device is able to support fragile articles, such as lamps, and safeguard them against damage by damping any shocks which the device may be subjected to. This invention can be properly combined with other available equipment to form a portable lighting unit which can be moved with minimum concern of lamp and bulb damage. Such a portable lighting unit can be used in relatively remote areas, such as oil fields, to assist in providing the lighting necessary for a drilling operation.

Additional advantages of the present invention will become readily apparent from the following discussion, when taken in conjunction with the accompanying drawings.

DETAILED DESCRIPTION OF THE PREFERRED EMBODIMENT

Figure 1:
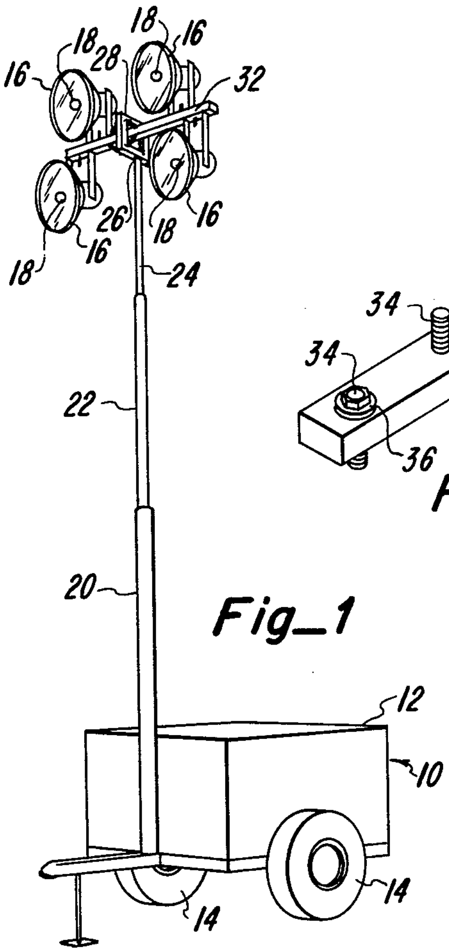
FIG. 1 is a perspective view of the present invention supporting a number of lamps and connected to a mobile unit.

With reference to the drawings, FIG. 1 depicts the present invention, in a preferred environment, connected to a mobile unit 10, which includes a housing body 12 and wheels 14 for supporting the housing body 12. The shock absorbing device is shown supporting a number of floodlights or lamps 16 which may include bulbs 18. The power for energizing the floodlights 16 is, typically, provided by a gasoline or diesel engine driven generator (not shown) which is mounted in the housing body 12.

The shock absorbing device includes a pole 20 which is fixedly mounted at its bottom end to the housing body 12. In a preferred configuration, the pole 20 has a telescoping feature provided by extendable portions 22, 24 to permit vertical adjustment of the pole 20 and enable the floodlights 16 to be positioned at different heights relative to the surface at which the mobile unit 10 is supported or moved. The pole 20 also has a top end 26 located at the end of the extendable portion 24. The top end 26 is joined to another element of the shock absorbing device, namely, a frame 28. Preferably, the pole 20 and the frame 28 are formed as an integral one-piece unit.

Figure 2:
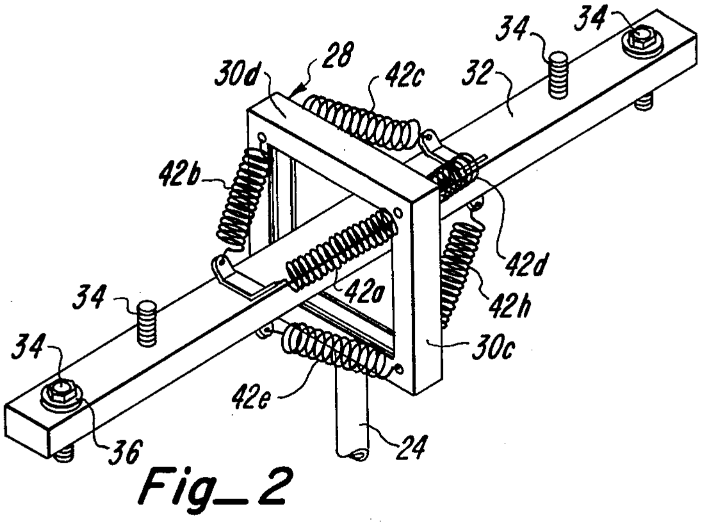
FIG. 2 is a perspective view of the present invention best illustrating the spring configuration.
Figure 3:
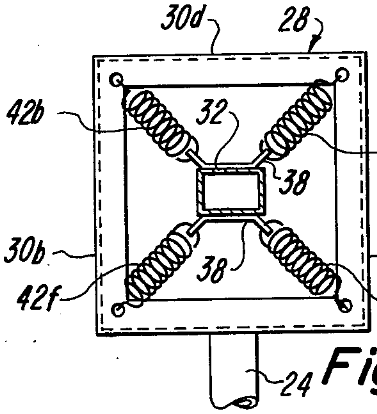
FIG. 3 is a lateral cross-sectional view showing the frame connected to the pole and extending upwardly therefrom.
Figure 4:
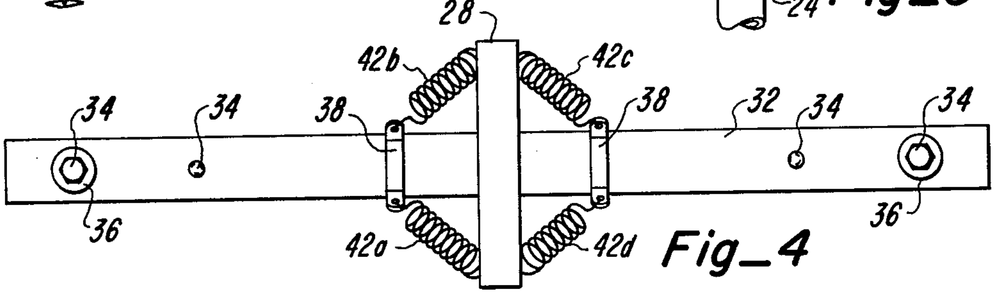
FIG. 4 is a top plan view showing another view of the spring arrangement of the present invention.
Figure 5:
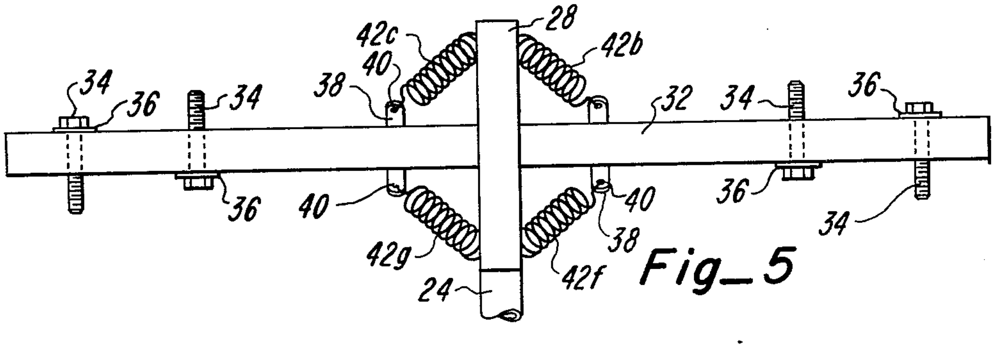
FIG. 5 is a back side plan view showing yet another view of the spring arrangement of the present invention.

As best seen in FIGS. 2 and 3, the frame 28 is a rectangular-shaped member having four legs 30*a*, 30*b*, 30*c*, 30*d*, which are joined together at their ends. In a preferred configuration, the frame 28 is essentially square and the legs 30*a*–30*d* are integrally joined together so that the frame 28 is a single member. A bottom leg 30*a* has an underside which contacts and is joined to the top end 26 of the telescoping pole 20 at about the midportion of the bottom leg 30*a*. A pair of vertically extending side legs 30*b*, 30*c* are joined to the bottom leg 30*a*. A first side leg 30*b* is joined to a first end of the bottom leg 30*a* and a second side leg 30*c* is joined to second opposite end of the bottom leg 30*a*. A top leg 30*d* interconnects and is joined to the other ends of the side legs 30*b*, 30*c*. As a consequence of the positioning of the legs 30*a*–30*d* it is seen that the frame 28 is joined to the pole 20 such that the frame 28 extends vertically upwardly from the top end 26 of the pole 20.

Also included in the shock absorbing device is a lamp support member or rod 32. The lamp support member 32, which is illustrated using different views in FIGS. 2, 3, 4 and 5, is an elongated, rectangular-shaped, in cross-section, member. The lamp support member 32 is positioned through the open portion of the frame 28 at about the center of the open portion and the lamp support member 32 is virtually horizontal and parallel to the plane of an even or smooth ground surface. In such a structural arrangement, the longitudinal axis of the lamp support member 32 is generally perpendicular to the longitudinal axis of the pole 20. It is also seen that the frame 28 is spaced from and surrounds a midportion of the lamp support member 32.

The lamp support member 32 has means spatially disposed along its longitudinal extent for use in connecting the floodlights 16 to the lamp support member 32. Holes are formed through the thickness of the lamp support member 32 and screw members 34 with washers 36 are located in the holes to fasten the floodlights 16 to the lamp support member 32. Two mounting pieces 38 having spring engaging ends 40 are joined to the top side of the lamp support member 32, in the near vicinity of the frame 28, and on opposite sides of the frame 28. Similarly, two mounting pieces 38 having spring engaging ends 40 are joined to the bottom side of the lamp support member, in substantial alignment with the mounting pieces 38 joined to the top side of the lamp support member 32.

The remaining major structural elements of the shock absorbing device are the eight springs 42*a*, 42*b*, 42*c*, 42*d*, 42*e*, 42*f*, 42*g*, 42*h*. Top springs 42*a*, 42*b*, 42*c*, 42*d* are connected at a first end to the spring engaging ends 40 and are located adjacent to the top side of the lamp support member 32 while the second ends of the top springs 42*a*, 42*b*, 42*c*, 42*d* are connected to the corners of the frame 28 at which side legs 30*b*, 30*c* intersect with the top leg 30*d*. In a similar matter, bottom springs 42*e*, 42*f*, 42*g*, 42*h* are connected at a first end to the spring engaging ends 40 located at the bottom side of the lamp support member 32. While the second ends of the bottom springs 42*e*, 42*f*, 42*g*, 42*h* are connected to the corners of the frame 28 at which side legs 30*b*, 30*c* intersect with the bottom leg 30*a*. In one configuration, the second ends of the springs 42*a*–42*f* are positioned through holes formed in the corners of the frame 28 to provide a proper connection between the springs 42*a*–42*f* and the frame 28.

The eight springs 42*a*–42*f* interconnect the lamp support member 32 and the frame 28 and, together with the other elements of the shock absorbing device, permit both horizontal and vertical movement of the pole 20 and frame 28 relative to the lamp support member 32 and, correspondingly, horizontal and vertical movement of the lamp support member 32 relative to the pole 20 and the frame 28. Such horizontal and vertical movement enables the shock absorbing device to absorb or dampen shocks to which it may be subjected. In this regard, the springs 42*a*–42*f* of the present invention act, through spring resiliency, to absorb both compressive and tensile stresses which may arrive as a result of shocks transmitted from the mobile unit 10 to the pole 20, frame 28 and lamp support member 32. In response to each shock, some of the eight springs 42*a*–42*h* will initially experience compressive stresses, while other of the eight springs 42*a*–42*h* will be extended due to tensile stresses. The compressed springs will react to being in an unnatural physical state by extending under internal forces. Correspondingly, the extended springs will be compressed by like internal forces. Transformation of the springs will continue in a diminishing, oscillatory fashion until equilibrium is reached. In this manner, each wave of shock can be quickly absorbed by the eight springs 42*a*–42*h* working together in combination to minimize the amount of shock that reaches the individual floodlights 16.

As can be seen from the FIGS. 2, 3, 4 and 5, each of the springs 42*a*–42*h* forms an acute angle with respect to the longitudinal axis of the lamp support member 32. Because of this angular placement of the springs 42*a*–42*h* , in conjunction with the vertical extending frame 28, both vertical and horizontal components of shocks can be absorbed simultaneously using the same eight springs 42*a*–42*h*. It is also understandable that the acute angle formed by the springs 42*a*–42*h* could assume any different number of magnitudes. As the acute angle increases, the shock absorbing device is biased or designed to better absorb vertical components of shocks in comparison with absorbing horizontal components of shock, i.e., as the acute angle approaches 90°, the ability to absorb vertical components of shocks is enhanced.

To further understand the shock absorbing capability of the present invention, examples of its operation are now provided. In the case of the mobile unit 10 encountering a large dip in the surface in which it is moving, the pole 20 and frame 28 would jerk downward relative to the lamp support member 32. This downward movement would cause the four top springs 42a–42d to compress while the downward movement would cause the four bottom springs 42e–42h to extend. The internal spring forces would then react to the compressive and tensile stresses respectively by "pushing" and "pulling" the lamp support member 32 downward. The bottom springs 42e–42h will then be compressed and the top springs 42a–42d extended. Next, the lamp support member 32 would be forced upward. Such up and down motion would continue until the entire force of the shock wave is absorbed by the springs 42a–42h. Without the springs 42a–42h there would be no cushioning effect and the lamp support member 32 and, ultimately, the floodlights 16 would be subject to considerable vertical shocks.

In the event that a bump, as opposed to a dip, is encountered by both wheels of the mobile unit 10, the shock absorbing device will function in the same manner as just described above except that the "up and down" cycle will start with the top springs 42a–42d extended and the bottom springs 42e–42h compressed.

In the case of only one wheel 14 of the mobile unit 10 encountering a large dip at one instance of time, the pole 10 will initially sweep through a downward arc centered about the connection point of the pole 20 and the housing body 12 of the mobile unit 10. This rotation of the pole 20 would be in the direction that corresponds with movement of the housing body 12 as the dip is encountered. The rotation would terminate as the dip "bottoms-out", and it will reverse direction as the wheel 14 moves out of the dip. The motion of the pole 20 would cause the shock absorbing device to move circumferentially about the connection point of the pole 20 and the housing body 12. As the mobile unit 10 passes through the dip, shocks with both a horizontal and a vertical component would be transferred to the shock absorbing device. Initially, the top springs 42a–42d, on the same side of the shock absorbing device as the wheel 14 encountering the dip, would be compressed. The bottom springs 42e–42h, on the other side of the shock absorbing device, would also be compressed. The remaining springs of the eight springs 42a–42h would be extended. As the internal spring forces are activated, the spring transformation would then be reversed, such oscillatory transformation would continue until equilibrium is reached. Again, it is evident that the springs 42a–42h working together would absorb the shocks and thereby cushion the movement of the floodlights 16.

In view of the foregoing description, a number of important advantages are achieved by the present invention. A shock absorbing device is provided in which the same springs absorb both vertical and horizontal components of shock to minimize possible damage to fragile articles connected to the device. Floodlights can be fastened to the device and move over terrain without serious concern of lamp breakage. Additionally, the present invention is relatively simple in construction and inexpensively made for ready attachment to conventional and available equipment. Although the present invention has been described with reference to a particular embodiment, it is readily understood that variations and modifications can be effected within the spirit and scope of this invention.

What is claimed is:

1. In a portable lighting unit including a mobile unit, a lamp supporting device, comprising:

a pole including a top end and a bottom end adapted to be connected to the mobile unit and having a vertically extending longitudinal axis;

a rectangular-shaped frame including four legs and four corners, the bottom side of one of said legs being connected to said top end of said pole, said remaining three legs positioned vertically above said pole;

an elongated support member, having a longitudinal axis, horizontally positioned through and spaced from said frame so that a portion of said support member is surrounded by but spaced from said frame, said longitudinal axis of said support member being substantially perpendicular to said longitudinal axis of said pole, said support member including means spatially disposed thereon for fastening lamps to said support member; and a number of springs, the first ends of some of said springs being connected to a top side of said support member and the first ends of the remaining of said number of springs being connected to a bottom side of said support member, said second ends of said springs being connected to the corners of said rectangular-shaped frame to interconnect said frame and said support member, said springs acting to absorb both vertical components and horizontal components of shocks; and the distance between each of said springs and said means for fastening the lamp being substantially less than the distance between each of said springs and the mobile unit.

* * * * *